United States Patent
Ohmuro

(10) Patent No.: US 7,289,737 B2
(45) Date of Patent: Oct. 30, 2007

(54) COMMUNICATION OPTICAL SYSTEM AND FREE-SPACE OPTICS COMMUNICATION APPARATUS

(75) Inventor: Ryuji Ohmuro, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 10/816,010

(22) Filed: Mar. 31, 2004

(65) Prior Publication Data

US 2004/0202415 A1   Oct. 14, 2004

(30) Foreign Application Priority Data

Apr. 10, 2003   (JP) .............................. 2003-106355

(51) Int. Cl.
   *H04B 10/00*   (2006.01)
(52) U.S. Cl. ........................ 398/128; 398/86; 398/138
(58) Field of Classification Search ................ 398/130, 398/131, 128, 24; 359/833, 638
   See application file for complete search history.

(56) References Cited

U.S. PATENT DOCUMENTS

| | | | |
|---|---|---|---|
| 4,671,613 A * | 6/1987 | Buhrer ........................ 359/495 |
| 4,783,851 A * | 11/1988 | Inou et al. ..................... 398/59 |
| 5,325,175 A * | 6/1994 | Mocker et al. ............. 356/491 |
| 5,530,577 A | 6/1996 | Orino et al. |
| 5,546,373 A * | 8/1996 | Koyama ..................... 369/120 |
| 5,552,594 A * | 9/1996 | Vandenberg et al. ..... 250/201.7 |
| 5,594,580 A | 1/1997 | Sakanaka et al. |
| 5,627,669 A | 5/1997 | Orino et al. |
| 5,883,730 A | 3/1999 | Coult et al. |
| 6,229,581 B1 * | 5/2001 | Yamamoto et al. ......... 348/757 |
| 6,384,944 B1 * | 5/2002 | Takayama et al. .......... 398/135 |
| 6,396,608 B1 * | 5/2002 | Neubert et al. ............. 398/131 |
| 6,493,122 B1 * | 12/2002 | Degura ....................... 398/128 |
| 6,529,327 B1 * | 3/2003 | Graindorge ................. 359/566 |
| 6,618,177 B1 * | 9/2003 | Kato et al. .................. 398/129 |
| 6,650,450 B1 * | 11/2003 | Orino et al. ................ 398/140 |
| 6,690,496 B2 * | 2/2004 | Hama et al. ................ 359/204 |
| 6,774,979 B2 * | 8/2004 | Suzuki ........................ 355/37 |
| 6,804,063 B2 * | 10/2004 | Thompson ................. 359/629 |
| 2001/0043380 A1 * | 11/2001 | Ohtsubo ..................... 359/159 |

(Continued)

FOREIGN PATENT DOCUMENTS

CA            2 273 691         12/1999

(Continued)

OTHER PUBLICATIONS

Official Letter dated Oct. 13, 2006 issued in German Patent Application No. 10 2004 017 493.8-35 with English translation.

*Primary Examiner*—Kenneth Vanderpuye
*Assistant Examiner*—Thi Q. Le
(74) *Attorney, Agent, or Firm*—Morgan & Finnegan LLP

(57) ABSTRACT

A communication optical system having a compact structure and capable of preventing crosstalk is disclosed. The communication optical system includes a light source, a light-receiving element and a beam-splitting member. The beam-splitting member performs one of transmission and reflection towards an incident/emergent port, and performs one of reflection and transmission towards the light-receiving element of a second light beam from the incident/emergent port. The light source and the light-receiving element are arranged on the same side with respect to the beam-splitting member.

2 Claims, 5 Drawing Sheets

U.S. PATENT DOCUMENTS

| | | | |
|---|---|---|---|
| 2002/0080452 A1* | 6/2002 | Sakanaka | 359/172 |
| 2002/0163691 A1* | 11/2002 | Wong et al. | 359/127 |
| 2003/0044636 A1 | 3/2003 | Sakanaka | |
| 2004/0151504 A1* | 8/2004 | Triebes et al. | 398/131 |
| 2005/0174639 A1* | 8/2005 | Zalevsky et al. | 359/484 |

FOREIGN PATENT DOCUMENTS

| | | |
|---|---|---|
| DE | 406 311 B | 4/2000 |
| JP | 3339014 | 8/2001 |
| JP | 3339014 | 10/2002 |

* cited by examiner

COMMUNICATION OPTICAL SYSTEM AND FREE-SPACE OPTICS COMMUNICATION APPARATUS

BACKGROUND OF THE INVENTION

1. Field of the Invention

The present invention relates to communication optical systems used for a communication apparatus such as a free-space optics communication apparatus, which project light from a light source to another apparatus and guide the light from the receiving apparatus to a light-receiving element.

2. Description of Related Art

FIG. 5 shows the structure of a communication optical system of a free-space optics communication apparatus, which is disclosed in Japanese Patent No. 3339014.

In FIG. 5, reference numeral 1 denotes a light source, reference numerals 2 and 6 denote light-receiving elements, and reference numeral 110 denotes a first prism. The prism 110 includes a beam-splitting surface 111, which reflects light emitted from the light source 1 towards another apparatus (not shown in the drawings) and transmits light from the other apparatus towards the light-receiving elements 2 and 6.

Reference numeral 120 denotes a second prism for guiding light from the other apparatus, which has been transmitted by the beam-splitting surface 111, to the light-receiving element 2 or the light-receiving element 6.

Next, the functionality of the overall free-space optics communication apparatus is explained in accordance with the direction in which the light travels.

First, the light sent out by the light source 1 is approximately collimated by a collimator lens 103, and is incident on the first prism 110. Then, the sent light is reflected by the beam-splitting surface 111 towards a beam expander 140, and emerges from the prism 110 through an incident/emergent port 112. The beam expander 140 broadens the width of the sent light and projects it towards the other apparatus (not shown in the drawings).

On the other hand, the light received from the other apparatus is transmitted by the beam expander 140, is incident on the first prism 110 through the incident/emergent port 112, and is incident on the second prism 120 after being transmitted by the beam-splitting surface 111. A portion of the received light which is incident on the second prism 120 is reflected by a half-mirror surface 122 in the direction of the light-receiving element 2, is condensed by a lens 102, and reaches the light-receiving element 2. The received light which is transmitted through the half-mirror surface 122 emerges after passing through a third prism 130, is condensed by a lens 103, and reaches the light-receiving element 6.

First, the light sent out by the light source 1 is approximately collimated by a collimator lens 101, and is incident on the first prism 110. Then, the sent light is reflected by the beam-splitting surface 111 towards a beam expander 140, and emerges from the prism 110 through an incident/emergent port 112. The beam expander 140 broadens the width of the sent light and projects it towards the other apparatus (not shown in the drawings).

The reason for providing this parallel portion 121 is to prevent that light which is emitted from the light source 1 is incident on the light-receiving element 2. That is to say, by providing the parallel portion 121 with a certain length Z, it is ensured that the light emitted from the light source 1 is not incident on the light-receiving element 2, as shown by the bold broken line 150 in FIG. 5. Thus, it is possible to prevent cross-talk which may be caused by receiving light sent from the light source 1 with the light-receiving element 2.

However, since in the structure shown in FIG. 5 it is necessary to provide the second prism 120 with the parallel portion 121, the second prism 120 becomes large.

SUMMARY OF THE INVENTION

It is thus an object of the present invention to provide a communication optical system having a compact structure and capable of preventing cross-talk, as well as a free-space optics communication apparatus including the same.

A communication optical system in accordance with one aspect of the present invention comprises a light source, a light-receiving element, and a beam-splitting member. The beam-splitting member performs one of transmission and reflection towards an incident/emergent port of a first light beam from the light source, and performs one of transmission and reflection towards the light-receiving element of a second light beam from the incident/emergent port. The light source and the light-receiving element are arranged on the same side with respect to the beam-splitting member.

These and further objects and features of the communication optical system and the free-space optics communication apparatus of the present invention will become apparent from the following detailed description of preferred embodiments thereof taken in conjunction with the accompanying drawings.

DETAILED DESCRIPTION OF THE PREFERRED EMBODIMENTS

The following is a description of preferred embodiments of the present invention, with reference to the accompanying drawings.

Embodiment 1

Figure 1:
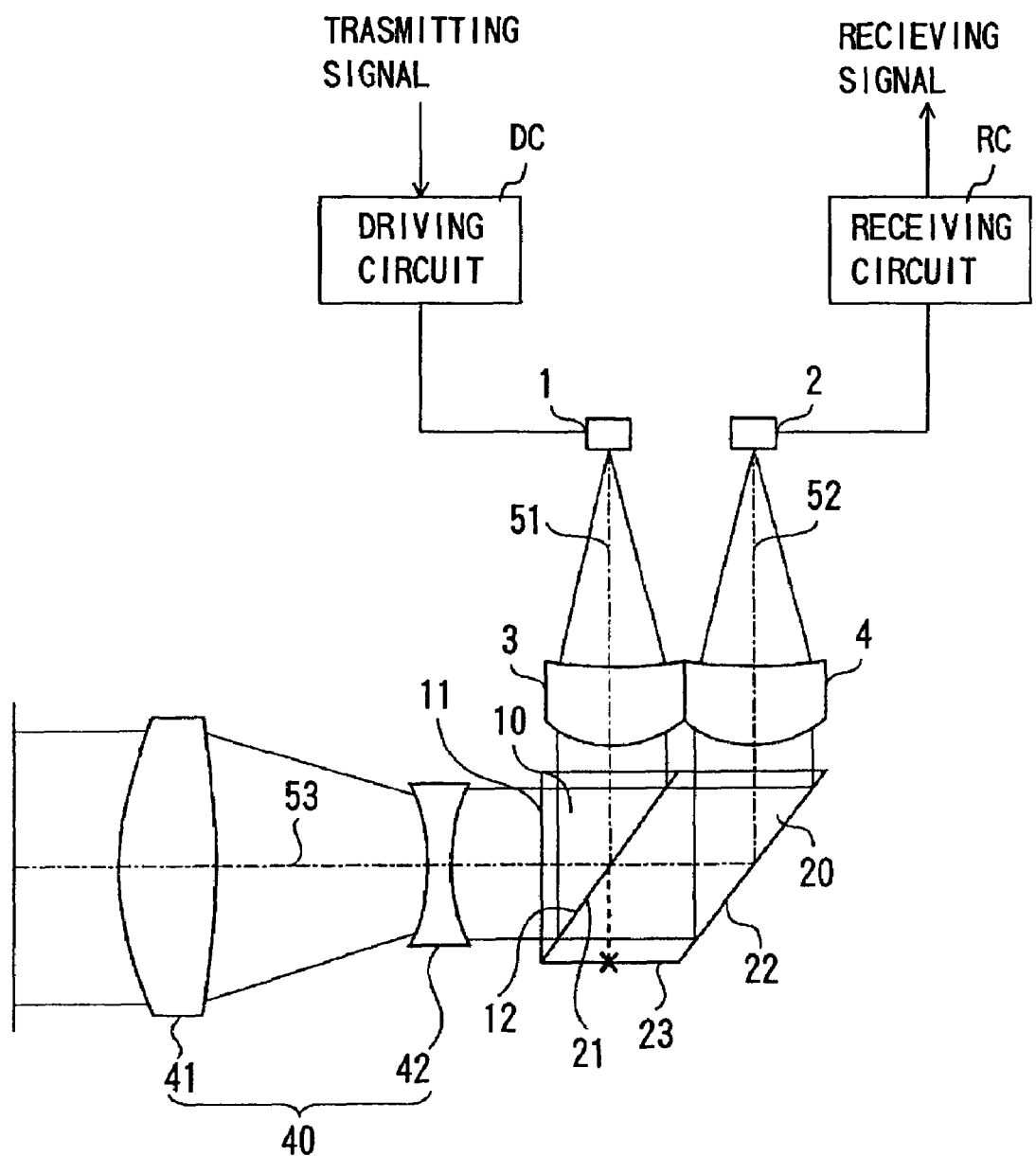
FIG. 1 is a cross-sectional view of a communication optical system according to Embodiment 1 of the present invention.

FIG. 1 shows the structure of a communication optical system of a free-space optics communication apparatus in accordance with Embodiment 1 of the present invention.

In FIG. 1, reference numeral 1 denotes a laser diode light source (referred to as "LD" in the following), reference numeral 2 denotes a light-receiving element using an APD (avalanche photo-diode), reference numeral 3 denotes a collimator lens, which substantially collimates the light emitted from the light source 1, and reference numeral 4 denotes a collective lens, which condenses substantially collimated light onto the light-receiving element 2. In this embodiment, the collimator lens 3 and the collective lens 4 are lenses of the same structure.

Reference numeral 40 denotes a beam expander constituted by a convex lens 41 and a concave lens 42. Reference numeral 10 denotes a first prism, which has a beam-splitting surface 12 serving as a beam-splitting member. The beam-splitting surface 12 reflects the light from the light source 1 (sent light) towards the beam expander 40, and deflects this light towards another apparatus, while transmitting light from the other apparatus (received light), which is incident from the beam expander 40, towards the light-receiving element 2.

Reference numeral 20 denotes a second prism, which includes a first surface 21 attached to the beam-splitting surface 12, and a second surface 22, which is substantially parallel to the first surface 21.

It should be noted that the light source 1 is connected to a driving circuit DC, which modulates the light source 1 in accordance with a send signal which is input into it. On the other hand, the light-receiving element 2 is connected to a receiving circuit RC serving as an output circuit, which converts the electrical signals obtained by photoelectric conversion with the light-receiving element 2 into a format which can be received by a receiving device (not shown in the drawings) and outputs them as received signals.

Next, the functionality of the overall free-space optics communication apparatus is explained in accordance with the direction in which the light travels.

First, the sent light beam sent out by the light source 1 is approximately collimated by the collimator lens 3, and is incident on the first prism 10. Then, the sent light beam incident on the first prism 10 is reflected by the beam-splitting surface 12 towards the beam expander 40, and emerges from the incident/emergent port 11 of the first prism 10.

The beam expander 40 broadens the width (diameter) of the sent light beam incident on it, and projects it towards the other apparatus (not shown in the drawings).

On the other hand, the received light beam received from the other apparatus is transmitted by the beam expander 40 in the direction opposite to that of the sent light, and is incident from the incident/emergent port 11 on the first prism 10. The received light beam incident on the first prim 10 is transmitted by the beam-splitting surface 12 and is incident on the second prism 20.

The received light beam incident on the second prism 20 is totally reflected towards the light-receiving element 2 by the second surface 22, is condensed by the collective lens 4, and reaches the light-receiving element 2.

The following is an explanation of the structure of the beam-splitting surface 12. In this embodiment, a LD is used for the light source 1, so that the polarization direction of the light beam emitted therefrom is approximately aligned in one direction. The polarization ratio may be greater than 100:1. Therefore, a high separation efficiency can be attained if the beam-splitting surface 12 utilizes the polarization of the light, so that in this embodiment a polarization beam-splitting film is used for the beam-splitting surface 12.

The oscillation direction (polarization direction) of the electric field component of the sent light beam emitted from the light source 1 is set such that it coincides with the S-component direction of the beam-splitting surface 12. Therefore, the beam-splitting surface 12 theoretically reflects 100% of the sent light beam emitted from the light source 1, although in practice, there are also P-polarized components included in the light beam from the light source 1 or in the light beam incident on the polarization beam-splitting film, or the angle of the polarization beam-splitting film might not exactly match the polarization direction of the light beam from the light source 1, so that there is a tiny level of transmitted components.

If those components of the sent light beam which leak through without being reflected by the beam-splitting surface 12 are incident on the light-receiving element 2, they may significantly obstruct the communication by causing noise or crosstalk or the like.

In order to address this issue, the present embodiment employs a structure in which the light source 1 and the light-receiving element 2 are arranged on the same side of the first prism 10 and the second prism 20, as shown in FIG. 1. Therefore, it can be prevented that sent light emitted from the light source 1 and leaking through the polarization beam-splitting film (beam-splitting surface 12) is directly incident on the light-receiving element 2.

Figure 5:
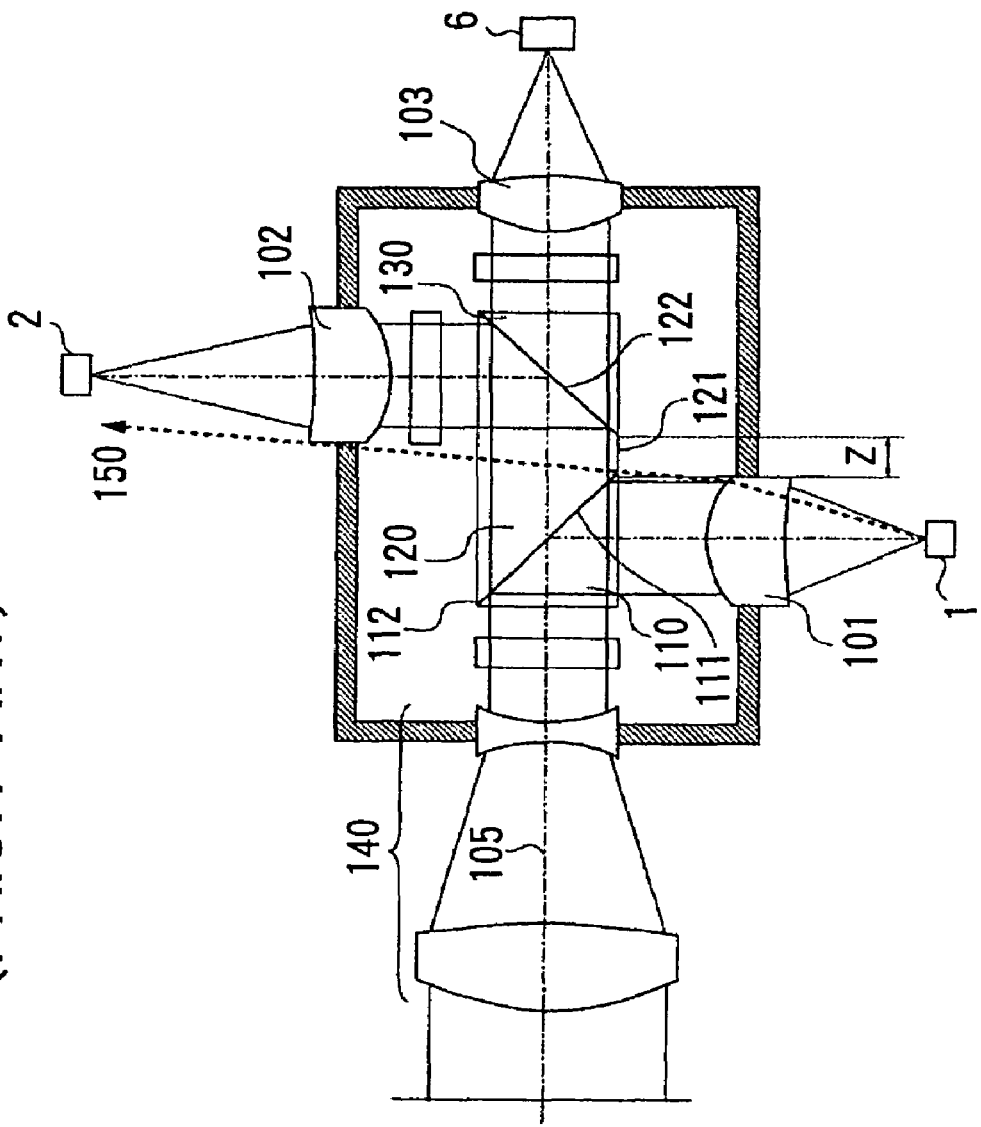
FIG. 5 is a cross-sectional view of a conventional communication optical system.

Moreover, it is not necessary to provide the prisms with a parallel portion 121 as in the conventional optical system shown in FIG. 5, so that the prism portion (that is, the length from the incident/emergent port 11 to the emerging surface of the second prism 20) can be made compact.

In the second prism 20, a (third) surface 23 positioned on the opposite side of the beam-splitting surface 12 of the first prism 10 with respect to the light source 1, that is, a surface on which the sent light is incident which has leaked through the polarization beam-splitting film (beam-splitting surface 12) is provided with an anti-reflective coating, or turned into frosted glass and provided with an optically absorbing coating. Thus, it is possible to ensure that light leaking through the polarization beam-splitting film (beam-splitting surface 12) is not even indirectly incident on the light-receiving element 2.

The following is an explanation of other possible structures for the structural elements used in this embodiment.

In this embodiment, the two surfaces 21 and 22 of the second prism 20 are substantially parallel to each other, but it is possible to make them parallel by design and to use a double-sided lapping machine with which parallel surfaces can be made with high precision when machining the second prism 20. Thus, the two surfaces can be polished with high precision in a single processing step. Furthermore, the second prism 20 can be fabricated by polishing the other surfaces after polishing the two surfaces. Therefore, the processing costs are lower than for prisms, which do not have parallel surfaces, and in which each surface must be polished individually.

Moreover, other than a LD, it is also conceivable to use a light source such as an LED as the light source 1.

In this case, a high polarization ratio is not attained with the light source alone, but it is possible to provide a polarizer between the light source 1 and the beam-splitting surface 12 when using a polarization beam-splitting film for the beam-splitting surface 12, or to use a light source 1 with a different emission wavelength than in the light source of the other apparatus and to use a wavelength-splitting film (dichroic film) for the beam-splitting surface.

Figure 3:
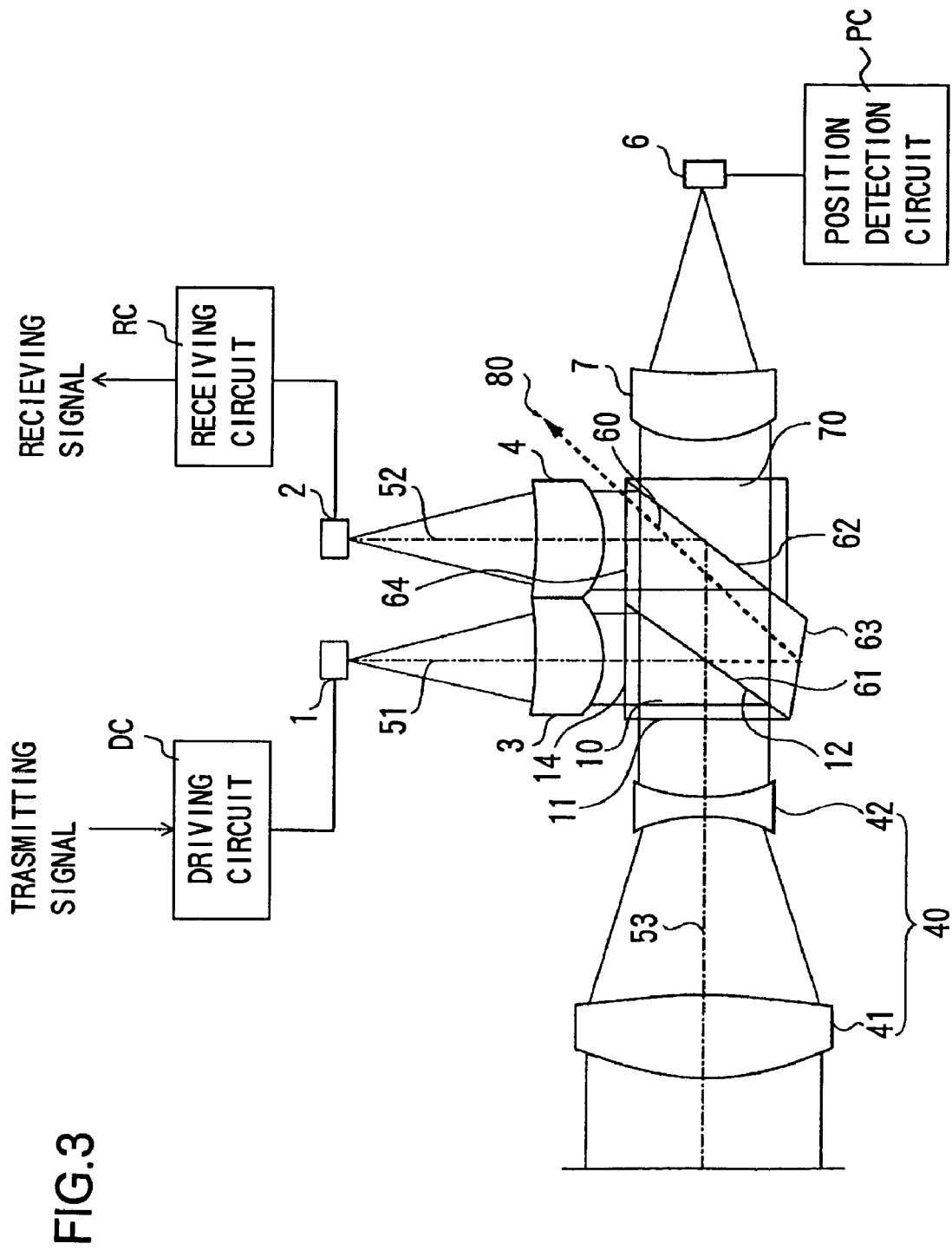
FIG. 3 is a cross-sectional view of the coupling between a light source and an optical fiber.

Alternatively, it is also possible to couple the light into an optical fiber 9, as shown in FIG. 3 for example, and to use the opposite end of the optical fiber 9 as the light source 1. FIG. 3 shows an example in which the light emitted by the light source is coupled into the optical fiber 9 by using ball lenses 8. If an optical fiber preserving the plane of polarization is used as the optical fiber 9, then it is possible to use the beam-splitting surface 12, which performs polarization separation.

Moreover, other than an APD, it is also conceivable to use a PIN photodiode for the light-receiving element 2. Furthermore, it is also conceivable to capture the received light beam with the light-receiving element 2 such that it travels along a path which is opposite to that in FIG. 3, after being coupled into the optical fiber 9.

Other than using a dichroic film or a polarization beam-splitting film for the beam-splitting surface 12, it is also possible to use an arrangement utilizing a micro-structure.

Moreover, in the present embodiment, a light beam passing through the first prism 10 is collimated using the collimator lenses 3 and 4, but the light beam does not necessarily have to be collimated, as long as this is permissible with regard to angular dependency of the polarization beam-splitting film.

Moreover, other than an APD, it is also conceivable to use a PIN photodiode for the light-receiving element 2. Furthermore, it is also conceivable to capture the received light beam with the light-receiving element 2 such that it travels along a path which is opposite to that in FIG. 2, after being coupled into the optical fiber 9.

Also the position at which the beam-splitting film 12 is provided is not limited to the position of the present embodiment, and it is also possible to provide it on the first surface 21 of the second prism 20.

Embodiment 2

Figure 2:
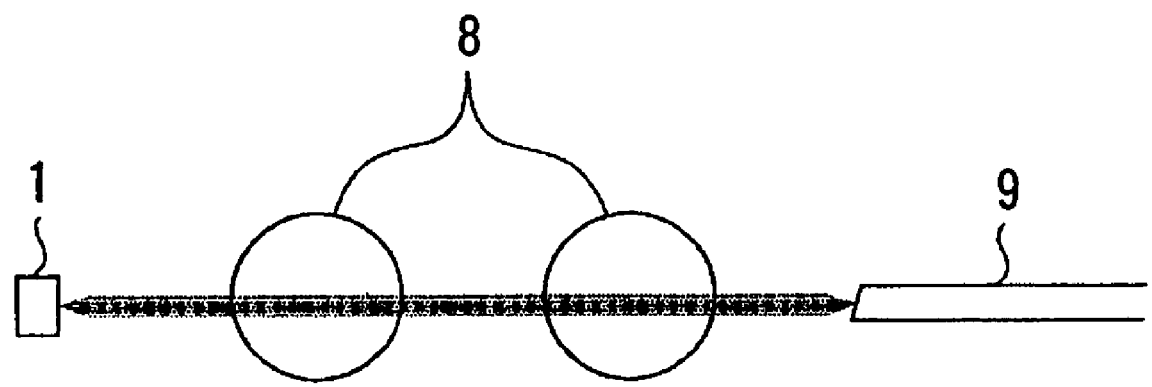
FIG. 2 is a cross-sectional view of a communication optical system according to Embodiment 2 of the present invention.

FIG. 2 shows the structure of a communication optical system of a free-space optics communication apparatus according to Embodiment 2 of the present invention.

In this embodiment, structural elements which are the same as in Embodiment 1 are denoted by the same reference numerals. In this embodiment, a light-receiving element 6, a third prism 70 and a collective lens 7 having a third lens portion have been added to the structure of Embodiment 1. Moreover, in this embodiment, a second prism 60 whose shape is different from that of the second prism 20 in Embodiment 1 is used.

The light-receiving element 2 is an APD which receives a received light beam emitted from the other apparatus, and has the function to extract the main signal components of this received light beam. On the other hand, the light-receiving element 6 is a position detection light-receiving element for detecting from which direction the light beam received from the other apparatus is incident, and may be a quad-photodiode (QPD) for example.

The second prism 60 and the third prism 70 are attached to one another at a surface 62. Moreover, a half-mirror is formed at the attachment portion of the surface 62, and arranged such that the light is distributed to the two light-receiving elements 2 and 6. The third prism 70 guides the light beam which has been transmitted through the surface 62 to the light-receiving element 6. The collective lens 7 condenses the light beam emerging from the third prism 70 onto the light-receiving element 6.

FIG. 3 shows the structure of a communication optical system of a free-space optics communication apparatus according to Embodiment 2 of the present invention.

Next, the functionality of the overall free-space optics communication apparatus is explained in accordance with the direction in which the light travels.

First, the sent light beam sent out by the light source 1 is approximately collimated by the collimator lens 3, and is incident on the first prism 10. Then, the sent light beam incident on the first prism 10 is reflected by the beam-splitting surface 12 towards the beam expander 40, and emerges from the incident/emergent port 11 of the first prism 10.

The beam expander 40 broadens the width (diameter) of the sent light beam, and projects it towards the other apparatus (not shown in the drawings).

On the other hand, the received light beam received from the other apparatus is transmitted by the beam expander 40 in the direction opposite to that of the sent light, is incident from the incident/emergent port 11 on the first prism 10, is transmitted by the beam-splitting surface 12 and is incident on the second prism 60. A portion of the received light beam incident on the second prism 60 is reflected by the half-mirror formed at the surface 62 in the direction of the light-receiving element 2, is condensed by the collective lens 4 and reaches the light-receiving element 2.

Moreover, the light which has been transmitted through the half-mirror, is transmitted by the third prism 70, is condensed by the collective lens 7, and reaches the light-receiving element 6.

The light-receiving element 6 for position detection is connected to a position detection circuit PC. With the signal from the light-receiving element 6, the position detection circuit PC detects the direction in which the light received from the other apparatus is incident, and corrects the direction in which the sent light beam is projected. More specifically, the orientation of the free-space optics communication apparatus or the communication optical system is regulated such that it matches direction in which the received light is incident. Thus, it is possible to efficiently receive a small quantity of sent light with the other apparatus, as well as to efficiently receive a small quantity of light from the other apparatus, and optical communication over longer distances becomes possible.

Now, with such a free-space optics communication apparatus, the intensity of the light from the other apparatus is lowered due to the absorption by air, which is the medium of the transmission, so that it is desirable to make also the intensity of the sent light components incident on the light-receiving element 2 small, such that there is no crosstalk. Consequently, it may in some cases be insufficient to mainly prevent the light from the light source 1 from being directly incident on the light-receiving element 2, as in Embodiment 1.

In order to address this issue, the surface 63 of the second prism 60 is provided with an anti-reflective coating, or is turned into frosted glass and prevented with an optically absorbing coating. Thus, it is possible to ensure that light leaking through the polarization beam-splitting film (beam-splitting surface 12) is not even indirectly incident on the light-receiving element 2.

Moreover, the surface 63 is not perpendicular to the optical axis 51 of the light source 1, but is arranged at an angle to the plane perpendicular to the optical axis 51. Thus, high-intensity components among the light reflected by the surface 63, as indicated by the bold broken line 80 in the figure, can be directed towards a direction in which they are not incident on the light-receiving element 2 or the light-receiving element 6. Moreover, the surface 63 does not contributed to the sending/receiving function, so that there is absolutely no necessity for it to be parallel to the surface 14 on which the sent light from the light source 1 is incident or the surface 64 from which the light received from the other apparatus emerges towards the light-receiving element 2.

Thus, by arranging the light source 1 and the light-receiving element 2 for detection of the main signal on the same side of the first and second prisms 10 and 60, and arranging the orientation of the surface 63 of the second prism 60 as described above, it is possible to effectively prevent crosstalk while keeping the prism portion (the length from the incident/emergent port 11 to the emerging surface of the third prism 70) compact.

It should be noted that in this Embodiment 2, the light-receiving element 2 is an APD serving as the element for retrieving the signal and the light-receiving element 6 is a QPD serving as the element for detecting the direction of incidence of the light from the other apparatus, but also the opposite arrangement is possible.

Embodiment 3

Figure 4:
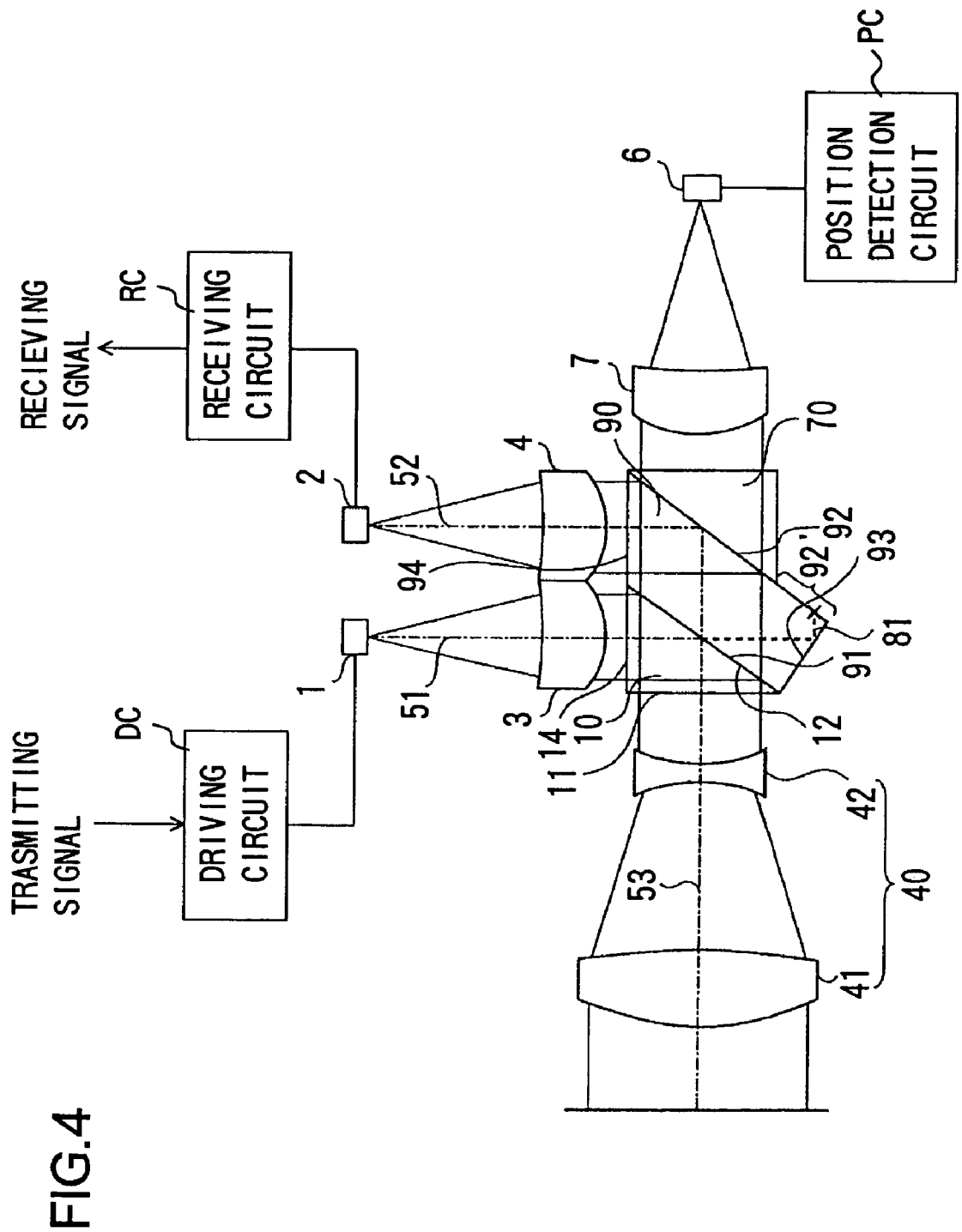
FIG. 4 is a cross-sectional view of a communication optical system according to Embodiment 3 of the present invention.

FIG. 4 shows the structure of a communication optical system of a free-space optics communication apparatus according to Embodiment 3 of the present invention.

It should be noted that in this embodiment, structural elements which are the same as in Embodiment 1 and 2 are denoted by the same reference numerals. In this embodiment, the second prism 60 of Embodiment 2 is replaced by a second prism 90 of different shape.

The (third) surface 93 of the second prism 90 forms an angle of substantially 90° with respect to the (first and second) surfaces 91 and 92, which are substantially parallel. Moreover, it includes a region 92', outside the region where the third prism 70 is attached to the second prism 90, which does not contribute to the sending/receiving function.

The functionality of the overall free-space optics communication apparatus is the same as in Embodiment 2.

In this embodiment, the surface 93 and the region 92' of the second prism 90 are provided with an anti-reflective coating, or is turned into frosted glass and provided with an optically absorbing coating, thus ensuring that sent light leaking through the beam-splitting surface 12 is not even indirectly incident on the light-receiving element 2. Moreover, in Embodiment 2, the angle of the surface 63 of the second prism 60 is set such that the reflected light components (of high intensity) are not directed towards the light-receiving element 2 or the light-receiving element 6, whereas the surface 93 of this embodiment is set such that the reflected light components are directed towards the region 92'. Thus, it is possible to provide, with a simple structure, a plurality of surfaces trapping the sent light leaking through the beam-splitting surface 12. As a result, an even larger crosstalk prevention effect than in Embodiment 2 can be attained.

Next, the reason for arranging the surface 93 at an angle of substantially 90° with respect to the two parallel surfaces 91 and 92 is explained. By making the surfaces 91 and 92 substantially parallel, it becomes easy to manufacture the second prism 90 with high precision (i.e. to perform a parallel plate polishing process), as explained in Embodiment 1. However, in Embodiments 1 and 2, after the two parallel surfaces have been polished, it is necessary to polish the surfaces 64 or 94 through which the light from the other apparatus emerges towards the light-receiving element 2. Moreover, the angle of the surface 23 or the surface 63 has to be processed separately from the surfaces 64 or 94.

However, rough cutting of the material is necessary for this parallel plate polishing process. On the other hand, by providing the surface 93 with an angle of substantially 90° with respect to the two substantially parallel surfaces 91 and 92, the surface formed by the rough cutting can be used as is for the surface 93, and it is possible to attain a reduction of costs through lower man-hours required while increasing the effect of preventing crosstalk.

With the embodiments as explained above, by arranging the light source and the light-receiving element on the same side of the beam-splitting surface 12, it is possible to prevent light sent out by the light source 1 from being directly incident on the light-receiving element and to suppress the occurrence of crosstalk.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication optical system comprising:
   a light source;
   a light-receiving element;
   a first and a second prisms, which are cemented to each other; and
   a beam-splitting member, which performs reflection towards an incident and emergent port, of a first light beam from the light source, and performs transmission towards the light-receiving element, of a second light beam from the incident and emergent port,
   wherein the beam-splitting member is arranged at a cemented portion of the first and second prisms, and the light source and the light-receiving element are arranged on the same side with respect to the first and second prisms;
   wherein the second prism comprises a first surface cemented to the first prism, a second surface which is parallel to the first surface and a third surface disposed on the opposite side of the first surface with respect to the light source;
   wherein the third surface is arranged non-perpendicularly to an optical axis of the first light beam extending from the light source to the beam-splitting member, and is arranged so as to intersect with an extended line of the optical axis of the first light beam extending from the light source to the beam-splitting member; and
   wherein the third surface is arranged such that the third surface forms an angle of 90° with respect to both the first surface and the second surface of the second prism.

2. A free-space optics communication apparatus comprising:
   the communication optical system according to claim 1;
   a driving circuit modulating the light source in accordance with communication information; and
   an output circuit outputting a signal from the light-receiving element.

* * * * *

UNITED STATES PATENT AND TRADEMARK OFFICE
CERTIFICATE OF CORRECTION

| | |
|---|---|
| PATENT NO. | : 7,289,737 B2 |
| APPLICATION NO. | : 10/816010 |
| DATED | : October 30, 2007 |
| INVENTOR(S) | : Ohmuro |

It is certified that error appears in the above-identified patent and that said Letters Patent is hereby corrected as shown below:

In Column 1, between Lines 61 and 62, insert:

--On the other hand, the light received from the other apparatus is transmitted by the beam expander 140, is incident on the first prism 110 through the incident/emergent port 112, and is incident on the second prism 120 after being transmitted by the beam-splitting surface 111. A portion of the received light which is incident on the second prism 120 is reflected by a half-mirror surface 122 in the direction of the light-receiving element 2, is condensed by a lens 102, and reaches the light-receiving element 2. The received light which is tranmitted through the half mirror surface 122 emerges after passing through a third prism 130, is condensed by a lens 103, and reaches the light-receiving element 6.

The light source 1 and the light-receiving element 2 are positioned ion opposite sides with the prism 110, 120 and 130 arranged between them. Therefore, the second prism 120 is provided with a parallel portion 121 which is parallel to an optical axis 105.--

In Column 2,

Line 36, change "FIG. 3" to --FIG. 2--;

Line 38, change "FIG. 2" to --FIG. 3--;

In Column 5,

Line 5, change "FIG. 3" to --FIG. 2--;

UNITED STATES PATENT AND TRADEMARK OFFICE
CERTIFICATE OF CORRECTION

| | | |
|---|---|---|
| PATENT NO. | : 7,289,737 B2 | |
| APPLICATION NO. | : 10/816010 | |
| DATED | : October 30, 2007 | |
| INVENTOR(S) | : Ohmuro | |

It is certified that error appears in the above-identified patent and that said Letters Patent is hereby corrected as shown below:

Lines 16-21, change "Moreover, other than a PDA, it is conceivable to use a PIN photodiode for the light-receiving element 2. Furthermore, it is also conceivable to capture the received light beam with the light-receiving element 2 such that it travels along a path which is opposite to that in FIG. 2, after being coupled into the optical fiber 9." to --Moreover, in the present embodiment, the lenses 3 and 4 serve as both collimator lenses and collective lenses, but also possible are structures in which lenses 3 and 4 are individual lenses, or in which one or both lenses are eliminated.--

UNITED STATES PATENT AND TRADEMARK OFFICE
CERTIFICATE OF CORRECTION

PATENT NO. : 7,289,737 B2
APPLICATION NO. : 10/816010
DATED : October 30, 2007
INVENTOR(S) : Ohmuro It is certified that error appears in the above-identified patent and that said Letters Patent is hereby corrected as shown below:

In Column 5,

Line 29, change "FIG. 2" to --FIG. 3--; and

Lines 58-60, change "FIG. 3 shows the structure of a communictaion optical system of a free-space optics communication apparatus according to Embodiment 2 of the present invention." to --The second prism 60 has a (third) surface 63 whose angle with respect to the optical axis is different from that of the surface 23 in the second prism 20 of Embodiment 1. The surface 63 is not arranged at a right angle with respect to the optical axis 51 of the sent light beam extending from the light source 1 to the beam-splitting surface 12, but is formed as an inclined surface.--

Signed and Sealed this

Twenty Second Day of April, 2008

JON W. DUDAS
*Director of the United States Patent and Trademark Office*